UNITED STATES PATENT OFFICE.

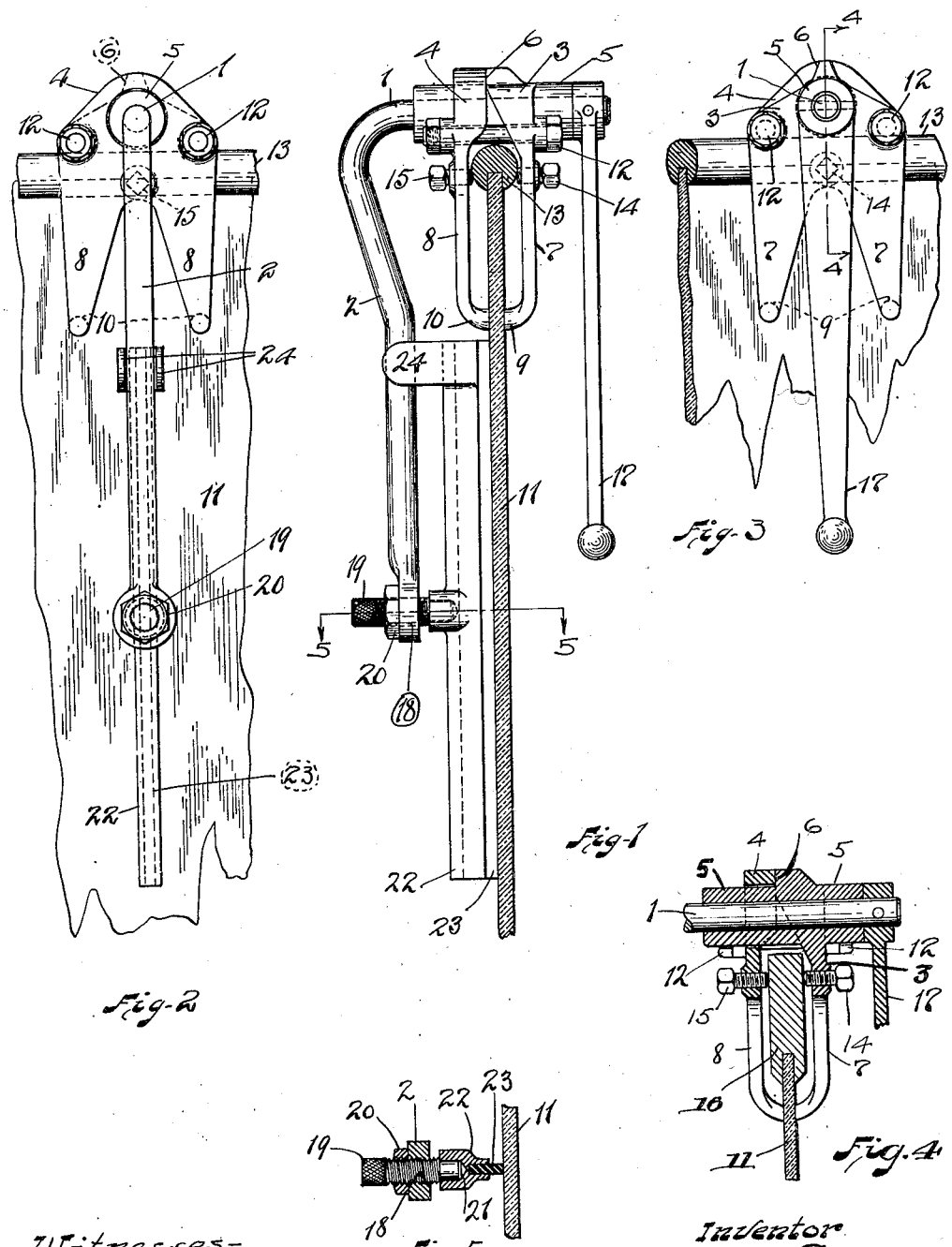

JAMES J. TRACY, OF CLEVELAND, OHIO.

WINDOW-CLEANING DEVICE.

1,099,143.　　　　　Specification of Letters Patent.　　Patented June 2, 1914.

Application filed February 20, 1913.　Serial No. 749,637.

*To all whom it may concern:*

Be it known that I, JAMES J. TRACY, a citizen of the United States, and a resident of Cleveland, county of Cuyahoga, and State of Ohio, have invented a new and useful Improvement in Window-Cleaning Devices, of which the following is a specification, the principle of the invention being herein explained and the best mode in which I have contemplated applying that principle, so as to distinguish it from other inventions.

The present improved window cleaning device is primarily intended for use on the wind shields of automobiles or in analogous situations, although it is not necessarily limited to such particular field of use.

The object of the invention is to provide a device of the kind in question, which may be readily affixed to a wind shield, or the like, without in any wise marring the frame of the latter, or requiring the use of any tools, other than a wrench. At the same time the device is adjustable to insure the thorough cleaning action which is necessary if the device is to be of use at all.

To the accomplishment of the foregoing and related objects, the invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a side elevational view of the device shown as affixed to a wind shield of familiar construction, the latter appearing in vertical section; Fig. 2 is a front elevational view of the device and a broken portion of the wind shield, as viewed from the left in Fig. 1; Fig. 3 is a rear elevational view of the device, with the broken portion of the wind shield as before, viewing the same from the right in Fig. 1; Fig. 4 is a transverse section of the device taken on the plane indicated by the line 4—4, Fig. 3, and at the same time illustrates the device as applied to a modified form of wind-shield; and Fig. 5 is another transverse section taken on the plane indicated by the line 5—5, Fig. 1.

The principal operative element in the device consists of a spindle 1, carrying integral therewith a lever arm 2, such spindle and arm being conveniently fashioned out of a single piece of rod, bent to the form clearly shown in Fig. 1. The spindle 1, proper, is journaled in a bearing that is carried by one member 3 of a two-part clamping device, the other member 4 of which fits around the tubular extended portion 5 of the first member forming the bearing in question, and is adapted to contact with said first member at a single point 6. (Figs. 1 and 4).

The members 3 and 4 are respectively formed with downwardly depending bifurcated extension 7, 7 and 8, 8, of similar form, which terminate in inwardly directed feet or lugs 9, 9 and 10, 10, that are adapted to press against opposite faces of the pane 11 of glass in the wind shield, when the two members are drawn together by means of bolts 12 provided for this purpose.

In applying the device to a wind shield, the two members 3 and 4 are fitted together and the depending portions 7 and 8 fitted over the top edge of the wind shield frame 13 until the device rests on such frame; then by drawing up the bolts 12 the members are brought in contact at the point 6 and the ends 9 and 10 of the bifurcations simultaneously pressed against the pane 11, the three-point contact that is thus secured between the two members insuring their perfect alinement with the pane, and what is more important, the perpendicularity of the axis of the bearing 5 to such pane. When the members of the clamp are thus drawn together and the device adjusted on the wind shield, two set-screws 14 and 15, carried by said members, respectively, are adjusted to bear against the respective faces of the frame 13 so as to insure rigidity to the mounting.

It will be observed that the bifurcations of the clamp members are long enough to extend below, not merely the circular metallic frame 13 that is illustrated, because largely used in the construction of wind shields, but also below a wooden frame 16 of any ordinary or usual width, as illustrated in the modified construction of shield shown in Fig. 4.

To the inner end of the spindle 1, which projects a short distance beyond the bearing in the inner clamp member, is secured an operating handle 17 of any desired form and of suitable length to permit of the ready oscillation of the spindle with its recurved lever-arm 2 on the outside of the shield.

The extremity of this arm 2 is flattened and provided with a threaded opening 18, in which is fitted a short set-screw 19, preferably with a knurled head and provided with a lock-nut 20, whereby the screw may be secured in adjusted position.

The inner end of the screw 19 is turned down, as shown in Fig. 5, to fit in an aperture 21 in the back of a holder 22 that carries the wiper 23 proper, such aperture being preferably near the mid point of the holder. The wiper is of rubber, or rubberized fabric, as is usual in devices of this sort, being held in a groove in the inner edge of the holder. The upper end of the holder is furthermore provided with two outstanding ears 24, that laterally engage the lever arm 2, so that, when such arm is swung, the holder will be oscillated along therewith, while still being free to lie flat against the pane that is to be cleaned.

The portion of the lever-arm 2, in which the set-screw 19 is mounted, being at right angles to the spindle 1, and the latter being securely held by the clamp members 3 and 4 at right angles to the pane of the wind shield, it will be seen that the wiper-holder 22 will be in strict parallelism with the latter. Since the handle 17, secured as it is to the inner end of the spindle, will prevent movement of the latter in an outward direction in its bearing, the adjustment of the set-screw 19 will be effective to vary the degree of pressure with which the wiper acts on the pane.

I have found by practical experiment that sufficient resiliency will be secured in a lever arm of the substantial construction shown, it being necessary as a matter of fact, if a device of this sort is to be at all effective, that considerable pressure be exerted on the glass to be cleaned. By means of the present device, such pressure may be readily secured and wear of the wiper taken up, while it is an extremely simple matter to affix the device to any of the usual forms of wind shield. The simplicity of construction, together with the entire absence of any springs or other parts that are apt to become loose and rattle, will additionally commend the device to the motorist.

In conclusion, it should be explained that in using the term "wind-shield," both in this specification and the claims which follow, it is intended thereby to refer to the general structure, including the glass pane with its inclosing frame, where such a frame is employed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of two relatively movable clamp members arranged to press against opposite sides of a wind-shield, or the like, respectively, one of said members including a tubular extension forming a transversely disposed bearing and the other member surrounding such extension; means adapted to draw said members together; a spindle rotatable in such bearing; an operating handle attached to one end of said spindle; and a wiper operatively connected with the other end of said spindle.

2. In a device of the character described, the combination of two relatively movable clamp-members having extensions respectively arranged to press against opposite sides of a wind-shield, or the like, one of said members being formed with a transversely disposed bearing and the other member contacting with said first member; means between such contacting point and such extensions adapted to draw said members together; a spindle rotatable in such bearing; an operating handle attached to one end of said spindle; and a wiper operatively connected with the other end of said spindle.

3. In a device of the character described, the combination of two relatively movable clamp-members having extensions respectively arranged to press against opposite sides of a wind-shield, or the like, at laterally spaced points, one of said members being formed with a transversely disposed bearing and the other member contacting with said first member at a point above such bearing; means between such contacting point and such extensions adapted to draw said members together; a spindle rotatable in such bearing; an operating handle attached to one end of said spindle; and a wiper operatively connected with the other end of said spindle.

4. In a device of the character described, the combination of two separable clamp members adapted to fit over the edge of a wind-shield or the like, said members being adapted to contact at a point without such edge and each having two corresponding bifurcated extensions terminating in lugs adapted to contact with opposite sides of such shield at laterally spaced points; a bearing formed in one of said members; two bolts passing through said members at opposite sides of said bearing and adapted to draw said members together; set-screws in said members, respectively, adapted to contact with opposite sides of the frame of said wind-shield; a spindle rotatable in such bearing; an operating handle attached to one end of said spindle; and an arm carrying a wiper on the other end of said spindle.

5. In a device of the character described, the combination of two separable clamp members adapted to fit over the edge of a wind-shield or the like, said members being adapted to contact at a point without such edge and each having two corresponding bifurcated extensions terminating in lugs adapted to contact with opposite sides of such shield at laterally spaced points; a bearing formed in one of said members; two bolts passing through said members at opposite sides below said bearing, said bolts contacting with the edge of such shield between said members and being adapted to draw the latter together; a spindle rotatable in such bearing; an operating handle attached to one end of said spindle; and an arm carrying a wiper on the other end of said spindle.

6. In a device of the character described, the combination of a clamp adapted to be secured to the edge of a wind-shield or the like, said clamp being formed with a transversely disposed bearing; a spindle rotatable in such bearing; an operating handle attached to one end, and a lever arm, to the other end of said spindle; a wiper holder; a set-screw threaded in the outer end of said arm and engaging said holder at a point between the ends thereof whereby said holder may be moved away from said arm; and interengaging means retaining said holder parallel with said arm.

7. In a device of the character described, the combination of two separable clamp members adapted to fit over the edge of a wind-shield or the like; means adapted to draw said members together; a bearing formed in one of said members; a spindle rotatable in such bearing; an operating handle attached to one end and a lever arm to the other end of said spindle; a wiper holder having an aperture in its back approximately midway between its ends; a set-screw threaded in the outer end of said arm and having a smooth cylindrical end fitted into the aperture in said holder, whereby said holder may be moved away from said arm; and ears on said holder near one end thereof laterally engaging said arm.

Signed by me, this 17th day of February, 1913.

JAMES J. TRACY.

Attested by:
   JNO. F. OBERLIN,
   D. T. DAVIES.